United States Patent [19]

Knutson et al.

[11] Patent Number: 4,538,644

[45] Date of Patent: Sep. 3, 1985

[54] PRESSURE REGULATOR

[75] Inventors: Dale A. Knutson, Nashotah; Frank Fritz, Milwaukee, both of Wis.

[73] Assignee: Applied Power Inc., Milwaukee, Wis.

[21] Appl. No.: 502,699

[22] Filed: Jun. 9, 1983

[51] Int. Cl.³ .................. F15B 13/044; F17D 1/20
[52] U.S. Cl. .................... 137/625.64; 91/459
[58] Field of Search ............ 137/625.64; 91/459

[56] References Cited

U.S. PATENT DOCUMENTS

| | | | |
|---|---|---|---|
| 2,853,976 | 9/1958 | Gerwig et al. | 137/623 |
| 3,430,536 | 3/1969 | Oelrich | 91/47 |
| 3,521,535 | 7/1970 | Oelrich | 91/361 |
| 4,069,744 | 1/1978 | Taylor | 91/459 |
| 4,126,293 | 11/1978 | Zeuher et al. | 251/30 |
| 4,212,323 | 7/1980 | Qureshi | 137/625.64 |

Primary Examiner—John J. Camby
Attorney, Agent, or Firm—Fred Wiviott

[57] ABSTRACT

A pressure regulator includes an inlet adapted to be connected to a pressure source and a chamber in which the pressure is to be regulated. An orifice is provided between the inlet and the chamber for metering the flow of hydraulic fluid therebetween. In addition, regulating means is provided adjacent the orifice and is movable in a timed relation in response to a series of pulse signals for changing the effective flow area of said orifice whereby the pressure in the chamber varies with the integral of the voltage pulses.

24 Claims, 16 Drawing Figures

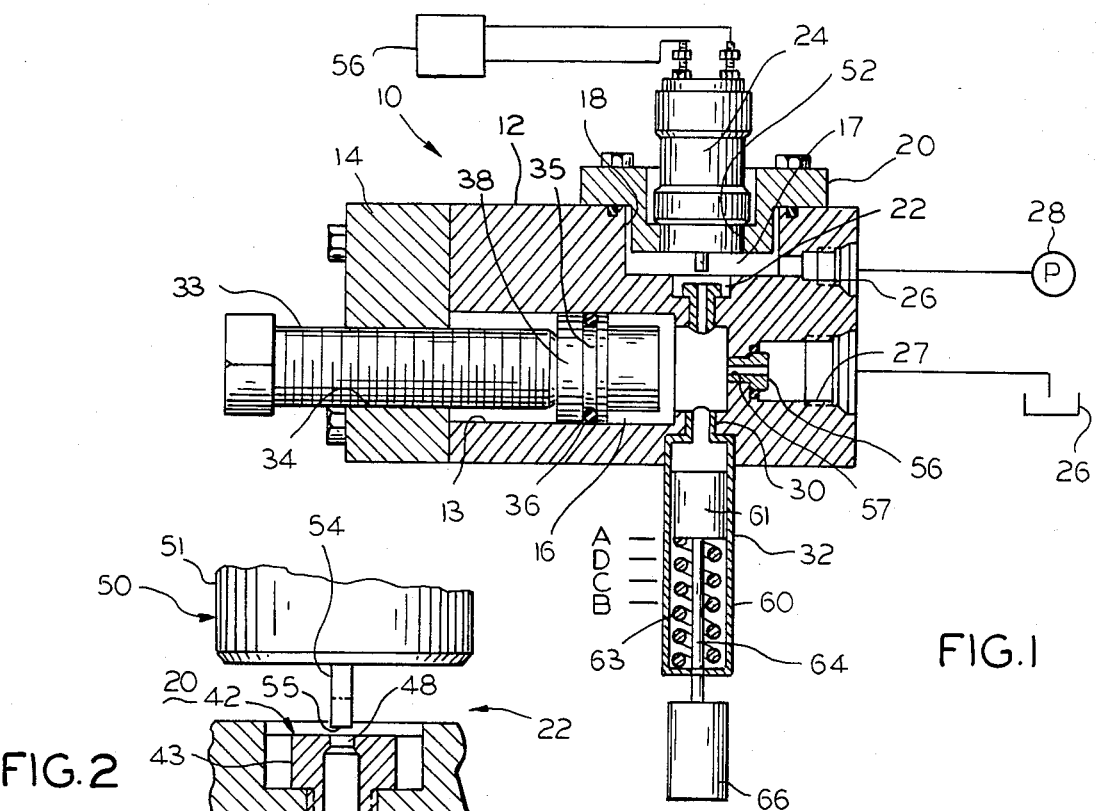
FIG.1
FIG.2
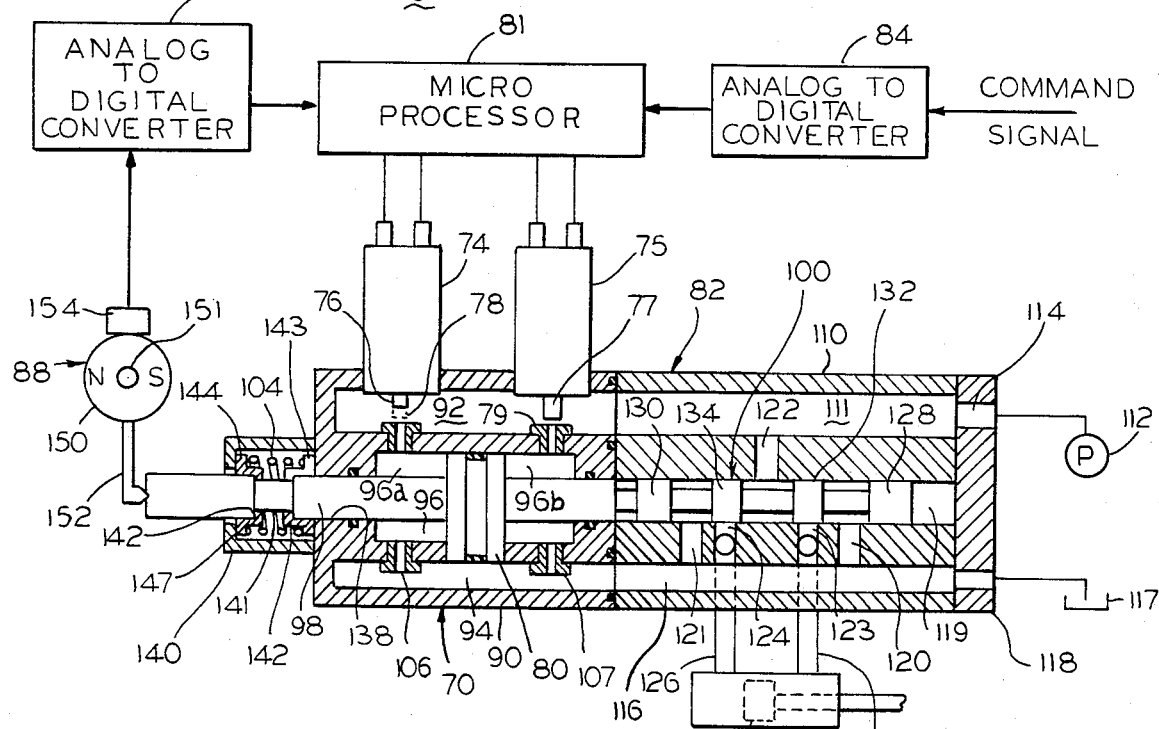
FIG.4

PRESSURE REGULATOR

BACKGROUND OF THE INVENTION

This invention relates to a pressure modulator and more particularly to a regulator for controlling the hydraulic pressure within a chamber.

Regulators for proportionally controlling hydraulic pressure in a chamber are widely used and, in one type of design, include a circular orifice having a ball disposed at one side thereof for orifice closure when the ball engages a seat formed in one side of the orifice structure. A solenoid actuated pin is positioned on the second side of the orifice and has a nose member which extends therethrough and is arranged to controllably open the orifice passage by unseating the ball in response to voltage signals of varying magnitudes which may be applied to the solenoid. The orifice passage is in fluid communication with a chamber in which pressure is to be controlled. As voltages of increasing magnitude are applied to the solenoid, the plunger advances to unseat the ball by an increasing amount thereby providing a progressively enlarging flow area for metering fluid flow into or out of the chamber to control the pressure therein.

An adaptation of this arrangement includes a solenoid-positioned plunger having a tapered nose member configured for fluid sealing engagement with the orifice when the plunger is in a first position. As voltages of increasing magnitude are applied to the solenoid, the plunger disengages the orifice seat to form a flow passage of increasing area, thereby permitting the controlled flow of fluid from the chamber and a consequent reduction of pressure therein.

Although these prior devices have heretofore provided a satisfactory means for regulating the hydraulic pressure within a chamber, both are subject to undesirable deformation of orifice seating surfaces over extended periods of service. Additionally, it has been found that the repetitive surface-to-surface contact of mating metal pieces tends to cause surface work hardening and resultant undesirable loss of small metal particles from the working surfaces, thereby impairing their effectiveness and contaminating the hydraulic system. Examples of prior art devices of this type are shown in U.S. Pat. No. 4,126,293 of Zeuner and U.S. Pat. No. 2,853,976 of Gerwig.

Other regulators for controlling the hydraulic pressure within a chamber include a proportionally positionable metering spool in closely fitted, sliding engagement with a spool bore. Positioning of the spool is by the application of voltages of varying magnitude to an associated solenoid for controllably opening a flow passage between a chamber and a tank. While this approach avoids the deformation of mechanical parts often associated with devices of the aforementioned type, the spool-type of pressure regulator has been found to be relatively sensitive to system contaminants and are frequently subject to silting caused by the accumulation of minute particles upon the bore-engaging edges of the spool. Additionally, designs of this type tend to have static and dynamic friction forces which are dramatically different from one another and tend to impair the accuracy with which the spool position may be controlled. All of the aforementioned design approaches are dependent upon accurate regulation of the magnitude of the voltage applied to the actuating solenoid. Unless this voltage is carefully regulated, impaired performance may result. Accordingly, a pressure regulator which is responsive to pulse width modulated electrical signals and which regulates pressure by means having no mechanical contact one with the other would be a significant advance over the prior art.

SUMMARY OF THE INVENTION

It is an object of the invention to provide a new and improved hydraulic pressure regulator.

Another object of the invention is to provide a pressure regulator responsive to the pulse width of a modulated electrical signal.

A further object of the invention is to provide a pulse width modulated pressure regulator which may be adapted to computerized hydraulic control systems.

A still further object of the invention is to provide a pressure regulator in which hunting is minimized.

Yet another object of the invention is to provide a hydraulic pressure regulator in which shock loading incident to commencement and termination of operation is minimized.

Still another object of the invention is to provide a hydraulic control valve in which the effect of silt in the hydraulic system is minimized.

These and other objects and advantages of the invention will become apparent from the detailed description of the preferred embodiments of the invention taken with the accompanying drawings.

According to one of its aspects, the invention comprises a pressure regulating device which includes orifice means for metering fluid from a pressurized source to a hydraulic chamber and regulating means movable in a timed relation in response to a series of pulse signals for movement between first and second positions relative to said orifice for defining a flow resistance path through said orifice functionally related to the frequency and duration of said pulse signals.

In one embodiment of the invention, the orifice has a predetermined cross-sectional area and the regulating means includes a solenoid actuated plunger movable between first and second spaced apart positions relative to said orifice in timed relation to each of a series of pulse signals. According to another embodiment of the invention, the regulator means may include a second orifice and an associated solenoid actuated plunger with the orifices respectively being coupled to the opposite sides of a piston whereby the position tnereof will be a function of the applied pulse signals.

According to another of its aspects, the invention comprises a method of regulating the pressure within a chamber having an inlet connected to a source of pressure and an outlet and an orifice disposed between the inlet and the chamber, including the steps of disposing a plunger in an opposed relation to the orifice whereby the distance between the plunger and the orifice will change the flow rate of liquid through the orifice, generating a series of discrete electrical pulse signals, moving the plunger into a first position which is a first finite distance from the orifice upon the initiation of each pulse signal and into a second position which is a second finite distance from the orifice upon the cessation of each pulse signal.

BRIEF DESCRIPTION OF THE DRAWINGS

FIG. 1 is a cross-sectional view illustrating a first embodiment of the present invention;

FIG. 2 is an enlarged view of a portion of the pressure regulator shown in FIG. 1;

FIG. 4 schematically illustrates an alternate embodiment of the present invention;

DETAILED DESCRIPTION OF THE PREFERRED EMBODIMENTS

Figure 3A:
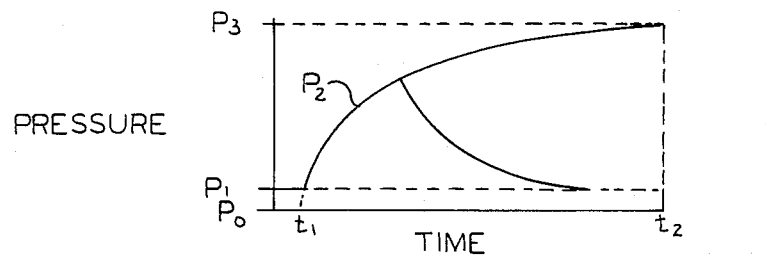
FIGS. 3A, 3B, 3C, 3D, 3E, 3F and 3G illustrate the operation of the pressure regulator shown in FIG. 1.

FIG. 1 shows the pressure regulator 10 according to a first embodiment of the present invention to include a body member 12 having a first bore 13 and an end closure plate 14 which defines a chamber 16 in which hydraulic pressure is to be controlled. A second chamber 17 is also provided in body member 12 by a second bore 18 formed generally normal to the first bore 13 and a closure member 20. The first and second chambers 16 and 17 are interconnected by a first orifice 22 and a flow modulator 24 is provided for modulating the flow of hydraulic fluid through orifice 22 and between chambers 16 and 17 in relation to the train of input pulses. An inlet 26 and an outlet 27 respectively open into the chamber 16 and are constructed and arranged to be connected, respectively, to a source of hydraulic fluid under pressure 28 and a sump or tank 29. A second outlet 30 opens into chamber 16 and is connected to a hydraulic device 32 being controlled.

The body 12 may be constructed of any suitably rigid material having a strength sufficient to withstand maximum chamber pressure without significant deformation. The bore 13 is generally cylindrical and may be formed in the body 12 by any conventional method such as casting or machining.

In order to permit the volume adjustment of the chamber 16 or to permit the installation of a pressure transducer for troubleshooting, closed loop feedback control or other reasons, an adjusting screw 33 is received in a threaded opening 34 formed in the closure plate 14 coaxially with the bore 13. The adjusting screw 33 has a piston 35 on its inner end which includes a resilient O-ring 36 circumferentially disposed in a ring groove 38 for fluid tight sealing with the wall of the bore 13. It will be appreciated that by turning the adjusting screw 33 inwardly or outwardly relative to the bore 13, the volume of chamber 16 can be adjusted. At its opposite end, the bore 13 has a reduced diameter section 40 which communicates with the orifice 22, the outlet 27 and the opening 30.

As seen in FIG. 2, the orifice 22 comprises an externally threaded orifice member 42 having a large diameter head portion 43 and an externally threaded shank 44 which is received in a countersunk threaded opening 46 formed in the body 12 and extending between the chambers 16 and 17. An orifice opening 48 of predetermined size is formed coaxially in the head portion 43 and opens into the hollow interior of shank 44.

The modulator 24 comprises a solenoid 50 having an outer housing 51 which is sealingly received in an opening 52 formed in the closure member 20 concentric with the orifice opening 48. A plunger 54 extends coaxially from the solenoid 50 and is positioned with its planer inner end 55 in an opposed relation to and spaced from the orifice opening 48. The solenoid 50 is connected to a pulse generator 56 which is constructed and arranged to provide a series of square pulses of relatively constant width which can be increased from zero to infinity or, in other words, to a constant DC potential. The solenoid plunger 54 is shown by full lines in a first position proximate to the orifice opening 48 when the solenoid 50 is de-energized and by broken lines in a second position more remote from the orifice 48 when the solenoid 50 is energized.

A second orifice is also defined by an orifice member 56 which is received in a threaded opening 57 formed in body 12 and extending between outlet 27 and chamber 16. Orifice member 56 may be similar to the orifice member 42 and will have a predetermined size which is selected so as to provide the desired output characteristic of the regulator 10.

The hydraulic device 32 being controlled is shown schematically in FIG. 1 to include a cylinder 60, a piston 61 and a return spring 63 which urges the piston 61 toward the end of cylinder 60 which communicates with the chamber 16. A stem 64 extends from piston 61 and is coupled to a transducer 66 which is responsive to the position of stem 64.

The operation of the pressure regulator 10 of FIG. 1 will now be discussed in relation to FIGS. 3A–3G. In particular, FIG. 3A shows the pressure within chamber 16 plotted against time. When the solenoid 50 is de-energized, the plunger 54 will be in its full line position shown in FIG. 2, or in other words, proximate to the orifice opening 48. This provides a first relatively high pressure drop across orifice opening 48 so that the pressure within the chamber 16 will be at a value P1 shown in FIG. 3A which is above tank pressure P0 or tank pressure existing at outlet 28. Should the solenoid 50 be energized at time t1, the plunger 54 will move to its broken line position shown in FIG. 2 which is displaced from orifice opening 48. This will increase the area of the flow path between chambers 16 and 20 to decrease the pressure drop across orifice 22. As a result, the pressure within chamber 16 will begin to increase along the curve P2 until it reaches a second steady state of pressure P3 at time t2. The time lapse between t1 and the time the pressure reaches $\frac{2}{3}$ of P3 will be the time constant of the system which is dependent upon various parameters. As the pressure within the chamber 16 increases from P1 to P3, the piston 68 will move from an initial position A to a second position B which positions define its travel limits.

Figure 3B:
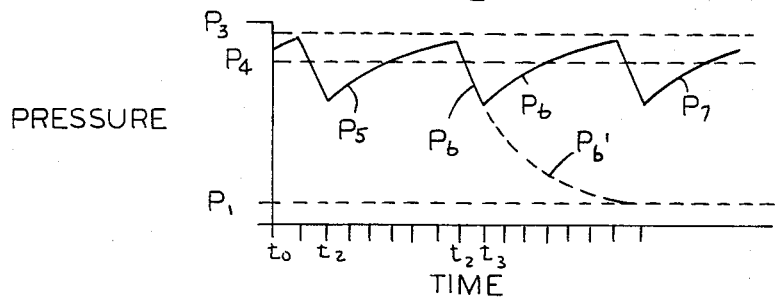
Figure 3C:
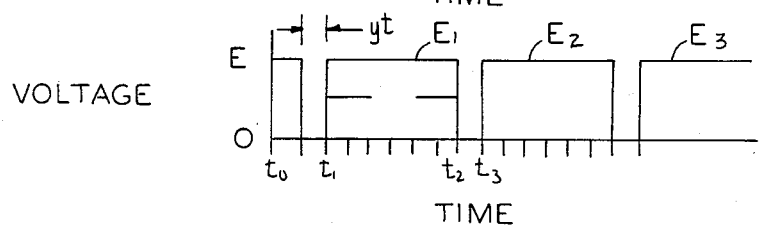

If it is desired to move the piston 61 to a third position C intermediate the positions A and B, a pressure P4 will be required within chamber 16 which is between pressures P1 and P3 as shown in FIG. 3B. This pressure is achieved by adjusting the pulse generator 55 to provide a train of square wave pulses E1, E2, E3 . . . each having an amplitude E. The first pulse E1 will commence at time t1 and terminate time at time t2 and the second pulse E2 will commence at time t3. Therefore, time t1–t3 is the cycle time for the pulses E1, E2, E3, . . . which have a width xt and are "off" for the time yt.

During the time t1–t2, the solenoid 50 is energized so that the pressure within chamber 16 will increase along the curve P5 and toward the steady state maximum pressure P3. However, before pressure P3 is achieved, the pulse E1 terminates whereby the solenoid 50 is de-energized for the time t2–t3 and until the commencement of the next succeeding pulse E2. During the short time interval t2–t3, the pressure within chamber 16 will decay along the curve P6 which, if the solenoid remained de-energized, would continue along the curve P6' until the steady state pressure P1 was reached. However, at time t3, the next succeeding pulse E2 commences so that the pressure will again increase along the curve P7. This will continue during the pulse train E1, E2, E3, . . . to provide the average integrated pressure P4 which will maintain the piston 61 in position C.

Figure 3D:
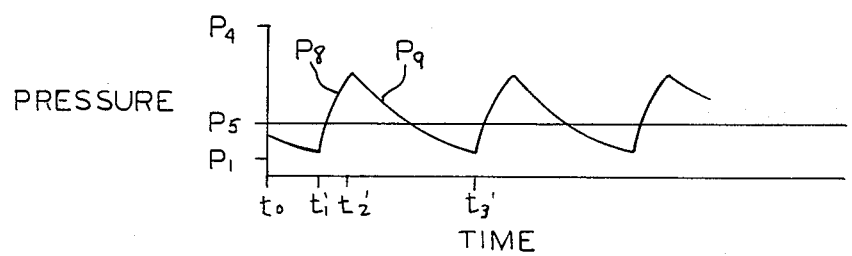
Figure 3E:
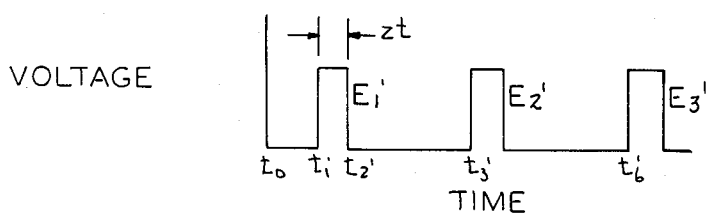

Assume next that the piston is to be located at a position D which is between positions A and C in FIG. 1. This will require a pressure P5 within chamber 16 which is between pressures P1 and P4 as shown in FIG. 3D. Toward this end, the pulse generator 55 is adjusted to provide a second train of square wave pulses E1', E2', E3', . . . as shown in FIG. 3E. Each of the pulses E1', E2' and E3' are positive going for a time zt which is a smaller percentage of the total cycle time t1'–t3' than the pulses E1, E2, E3 . . . Accordingly, during the time t1'–t2', the pressure within chamber 16 will increase along the curve P8. Then, at time t2', the pulse E1' terminates allowing pressure within the chamber 16 to decay along the curve P9. It can be seen that because the duration of the pulses E1', E2' and E3' . . . are shorter in duration than the pulses E1, E2, E3 . . . , the integrated pressure P5 will be lower than the integrated pressure P4 and above pressure P0 so that the piston 61 will move to position D between positions A and C.

Figure 3F:
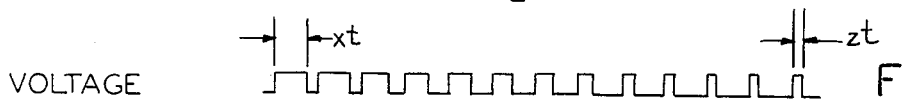
Figure 3G:
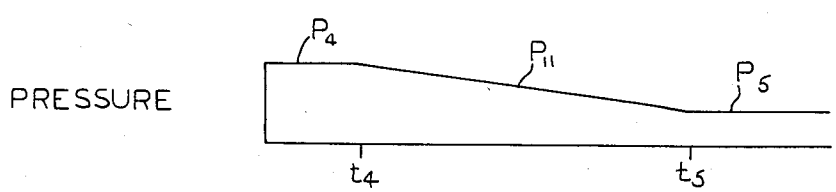

FIGS. 3F and 3G show the voltage and pressure as the width of the voltage pulses is adjusted to change the pressure within the chamber 16 from P4 to P5. Initially, the pulses will have the width of xt wherein the pressure P5 will exist. At time t4 however, the width of the pulses will be progressively decreased causing the pressure to decline along the line P11 until time t5 when the pulse width becomes zt. Of course, the pressures P4, P5 and P11 shown in FIG. 3G are average values, it being appreciated that the instantaneous pressure will be slightly irregular. In addition, the pulse train in FIG. 3F is merely shown by way of example, it being appreciated that in actual practice many more pulses would occur between times t4 and t5.

As seen in FIG. 2, a change in the energized state of the solenoid 51 merely modifies the displacement of plunger 54 relative to the orifice opening 28 rather than to effect a closure of the orifice. As a result, chamber 16 is provided with two discrete steady-state operating pressures. The transition from one pressure to the other is relatively slow because the flow of hydraulic fluid through orifice opening 28 is continuous. Most other pressure regulations of this type terminate fluid flow entirely causing rapid pressure escursions in the main control chamber. The continuous flow at either a high or low rate depending upon the position of plunger 54 provides the regulator 10 with a relatively long time constant. The time required for the pressure within chamber 16 to achieve either its high or low steady-state values, will be a function of the flow rate of fluid through the orifice when the plunger is either fully retracted or in its proximate position relative to the orifice opening 48. This timed manipulation of the fluid flow provides an effective control of the chamber 16 pressure at a relatively low cost.

FIG. 4 shows a modified form of the regulator 70 in accordance with a alternate embodiment of the invention as applied to the control of hydraulic fluid flow into a device such as cylinder 72 having a piston 73. The regulator includes a pair of solenoids 74 and 75, each provided with a plunger 76 and 77, respectively, and each is associated with one of a pair of orifices 78 and 79. The solenoids 74 and 75 may be selectively supplied with square wave voltage pulses from a microprocessor 81 to effect the displacement of a piston 80. Coupled to the piston 80 is a spool valve 82 which controls the flow of fluid to cylinder 72. The microprocessor 81 will generate signals in accordance with first and second input signals from first and second analog to digital convertors 84 and 86, respectively. The first analog to digital convertor 84 is coupled to receive an analog command signal and to provide a corresponding digital signal and the second analog to digital convertor is coupled to receive a piston position signal from a position responsive device 88 coupled to the piston 80.

The regulator 70 as shown more particularly to include a body 90 which defines a first chamber 92 adjacent its upper end, a lower second chamber 94 and a cylindrical bore 96 between the chambers 92 and 94. The piston 80 is reciprocally mounted within the bore 96 and is in sealing engagement therewith to divide the bore into segments 9a and 96b. A piston rod 98 extends axially from the opposite ends of piston 80 with one end coupled to a spool member 100 of spool valve 82 and the other end is connected to a centering spring 104. The orifices 78 and 79 extend between chamber 92 and bore sectors 96a and 96b, respectively. There is also a second pair of orifices 106 and 107 which respectively connect to the bore sectors 96a and 96b to the chamber 94.

The spool valve 82 also includes a housing 110 which forms a continuation of the housing 90. A first chamber 111 is formed in housing 110 and communicates at one end of the chamber 92 and at its other end to a source of pressure 112 through an inlet opening 114. In addition, there is a second chamber 116 formed at the opposite side of housing 110 and communicating at one end with chamber 94 and at its other end to tank 117 through an outlet aperture 118.

At the center of the housing 110 a cylindrical spool passage 119 is formed coaxially with the bore 96 for receiving the spool member 100. A plurality of spaced apart passages are formed in the housing 110 for connecting the spool passage 119 to the first and second chambers 111 and 116. In particular, first and second spaced apart passages 120 and 121 interconnect the spool passage 119 with the chamber 116 and a third passage 122 interconnects the spool passage 119 and the chamber 111 and lies generally intermediate the passages 120 and 121. There are also a first and second spaced apart ports 123 and 124 opening into the land passage 119 in spaced apart relation relative to each other and spaced inwardly, respectively, from the passages 120 and 121. A pair of conduits 125 and 126 connect the ports 123 and 124, respectively, to the externally controlled device 72, which in the example is shown to be a cylinder.

The spool member 100 includes a plurality of cylindrical lands spaced apart along its length and each has a diameter selected to closely engage the surface of the spool bore 119. More specifically, the spool member 100 includes first and second sealing lands 128 and 130 at its opposite ends for substantially fluid tight sealing of those portions of the spool passage 119 which are disposed therebetween. In addition, the lands 128 and 130 are spaced apart a distance greater than the passages 120 and 121 when the spool member 100 is in a central or null position as shown in FIG. 4. Third and fourth cylindrical lands 132 and 134 are also spaced apart from lands 128 and 130 on spool member 100 and are spaced apart from each other a distance greater than the diameter of passage 122 and are of sufficient axial extent to cover the passages 123 and 124. In addition, the lands 130 and 134 are disposed on the opposite sides of passage 121 and lands 128 and 132 are disposed on the opposite sides of passage 120.

One end of the piston rod 98 extends in a sealed relation through an opening 136 in one end of housing 82 and which is coaxial with the land passage 119. In addition, the piston rod 98 is connected to and forms an axial extension of the spool member 100 so that the two will move in unison. The opposite end of the piston rod 98 extends in a sealed relation through a coaxial opening 138 in the opposite end of housing 90 for engagement with the centering spring 104 and the position responsive device 88.

The spring 104 is disposed within an annular housing 140 affixed coaxially to the end of housing 90 and concentrically relative to the piston rod 98. That section of the piston rod 98 which is disposed within housing 140 has a reduced diameter portion 141 for slidably receiving the inner flanges 142 of each of a pair of sliding spring engaging members 143 and 144. The outer flanges 147 of members 143 and 144 embrace the opposite ends of the spring 104.

The position responsive device 88 may comprise any apparatus capable of providing a signal to the annalog to digital convertor 86 which is functionally related to the position of the piston 80. In the illustrated embodiment, the position indicating device includes a circular magnet 150 which is rotatably mounted on a shaft 151 and has an arm 152 extending downwardly therefrom with its opposite end coupled to the end of the piston rod 98. Disposed adjacent the periphery of the magnet 150 is a Hall effect sensor 154. As those skilled in the art will appreciate, the Hall effect sensor will provide a voltage output signal whose magnitude and sense is functionally related to changes in magnetic field direction and intensity. The magnet 150 is positioned such that its north and south poles are spaced equally from the Hall effect sensor 154 when the piston 80 is in a centered or null position. Accordingly, any movement of the piston from its null position will rotate the magnet 150 whereby the Hall effect sensor 154 will provide an appropriate voltage signal to the analog to digital convertor 86.

The size of the orifice 78 will be equal to that of the orifice 79 and the size of the orifice 106 will be equal to the size of the orifice 107. Also, when both of the solenoids 74 and 76 are de-energized, their respective plungers 76 and 77 will be equadistant from their associated orifices 78 and 79. This is shown by broken lines with respect to plunger 76 and full lines with respect to plunger 77 as seen in FIG. 4. When in this condition, the pressure drop across orifice 78 will be equal to that across orifice 79 so that the pressure in the sectors 96a and 96b of bore 96 will be equal. As a result, the piston 80 will be retained in a centered position as seen in FIG. 4. Accordingly, the lands 132 and 134 will isolate the cylinder 72 from the system pressure within chamber 111.

In the event it is desired to displace the piston 73 so as to perform a work function, a command signal is provided to the analog to digital convertor 84. This signal will contain information relating to the direction and displacement of the piston 73. The analog to digital convertor 84 will then provide digital signal to the microprocessor 71 which will, in turn, provide a series of pulse signals of the type shown in FIGS. 3C, 3E and 3F, to one of the solenoids 74 or 75 depending upon the desired direction of piston displacement. Additionally, the width of the pulse signals relative to the cycle time will be determined by the desired piston displacement speed.

Assume for example that it is desired to displace the piston 73 to the left as viewed in FIG. 4. Microprocessor 81 will then provide a series of actuating pulses to the solenoid 74 while the solenoid 75 remains de-energized. As a result, the solenoid plunger 76 will move from its position shown by broken lines in FIG. 4 to its position shown by full lines during the duration of each pulse. As a result, a smaller pressure drop will occur across orifice 78 then orifice 79 thereby providing a higher pressure within the sector 96a of bore 96 than in sector 96b. This will move the piston 80 to the right as viewed in FIG. 4 a distance functionally related to the width of the pulse signals received by the solenoid 74. The spool member 100 will also move to the right thereby at least partially uncovering the port 123 and connecting the same to the passage 122 while the port 124 is at least partially uncovered and connected to the passage 121. As a result, the right side of the cylinder 72 is connected to the pressure chamber 111 and the left side is connected to the tank chamber 116. The piston 73 will then move toward the left as viewed in FIG. 4.

If it is desired to move the piston 73 at a relatively slow rate, relatively narrow voltage pulses such as that shown in FIG. 3E will be provided to the solenoid 74. As a result, a relatively low pressure differential will exist in the opposite sides of piston 80 so that it will be displaced toward the right only a relatively short distance. This will only partially uncover the ports 123 and 124 so that fluid flow to the opposite sides of piston 73 will be restricted and the same will move at a relatively slow rate. On the other hand, if rapid displacement of the piston 73 is desired, relatively wider voltage pulses such as that shown in FIG. 3C will be provided to solenoid 74. This will provide a relatively higher pressure differential in the opposite sides of piston 80 so that the spool member 100 will be displaced a greater distance thereby uncovering a greater portion of the ports 123 and 124. It will be appreciated that if it is desired to move the piston 73 in the opposite direction, that is toward the right as viewed in FIG. 4, the solenoid 75 will be energized by the pulse train and the solenoid 74 will remain de-energized.

In order to insure that the piston 73 will be displaced at the desired speed, the position indicator 88 will provide a feedback signal to the analog to digital convertor 86 which will precisely indicate the position of the spool member 100 and the corresponding digital signal will be provided to the microprocessor 71. The microprocessor 79 will then make any necessary corrections in pulse width to insure correct piston speed. When the piston 73 reaches the limit of its desired travel, the command signal will be terminated whereby the pulse signals to the appropriate solenoid will be terminated so that the pressure in the opposite sides of piston 80 will equalize and the same will return to its null position thereby inclosing the ports 123 and 124.

Figure 5A:
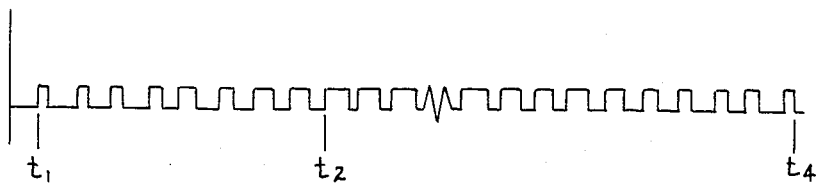
FIGS. 5A and 5B illustrate the operation of the pressure regulator shown in FIG. 4.
Figure 5B:
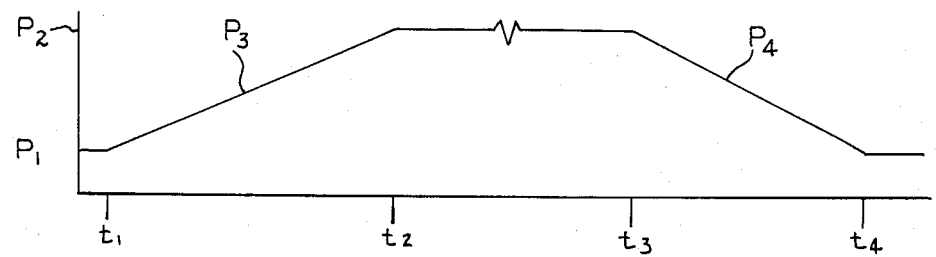

In the foregoing discussion of the operation of the pressure regulator 70 of FIG. 4, acceleration and deceleration of the piston 73 were ignored. However, in actual practice, the piston 73 will initially accelerate from rest to the selected travel speed and will then decelerate to zero velocity as it approaches the desired travel limit. This is illustrated in FIGS. 5A and 5B.

Assume, that both of the solenoids 74 and 75 are de-energized and that the pressure of P1 exists in the opposite sides of piston 80 which is in a null position. Assume further, that in order to achieve the desired travel velocity of piston 73, a pressure of P2 is required. Depending upon the direction in which the piston 73 is to be moved, one of the solenoids 74 or 75 will be energized with a series of voltage pulses at time t1 as shown in FIG. 5A. Initially, the pulses will be relatively narrow as the piston 73 begins to move. The width of the pulses will increase gradually until time t2 where they will be sufficiently wide to provide a pressure P2 on the appropriate side of piston 80. The piston 73 will thus accelerate between times t1 and t2 at which point it will reach the desired velocity. Pulses of this width will continue until time t3 when the piston approaches the limit of the desired displacement. At that time, the pulses will progressively decrease in width until time t4 when the pulses cease. During the period of decreasing pulse width, the pressure will decrease along the curve P4 until time t4 when the pressure P1 again exists on both sides of the piston 80. Accordingly, the piston 73 will decelerate during the time t3-t4 and will come to rest in the appropriate position at time t4. It will be appreciated that for purposes of illustration and because of space limitations, FIGS. 5A and 5B are substantially compressed.

Figure 6:
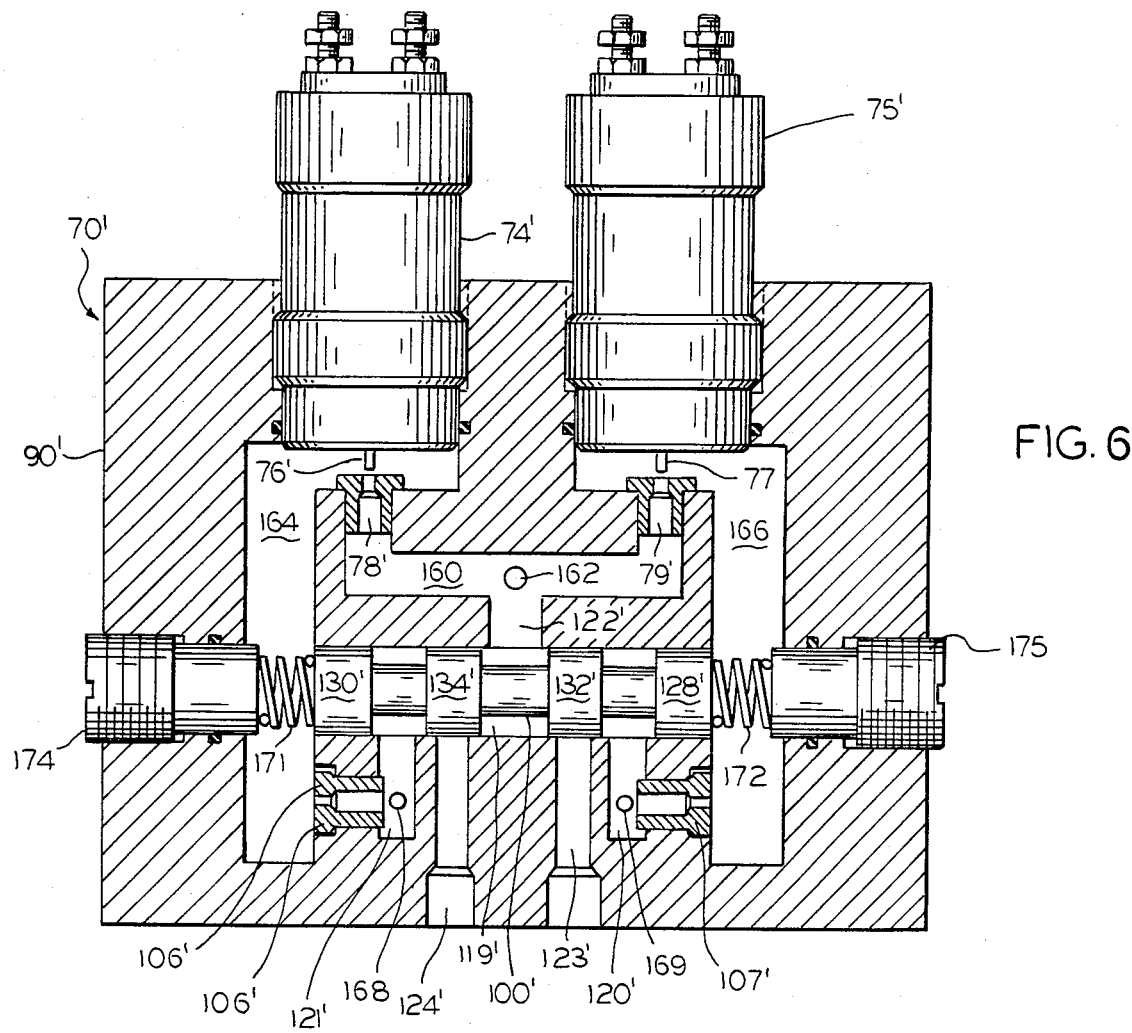
FIGS. 6, 7, 8 and 9 show alternate embodiments of the present invention.

FIG. 6 shows an alternate embodiment of the invention wherein variations in pressure act directly upon the spool valve. It will be understood that corresponding parts of the embodiment of FIG. 6 will function in the same manner as corresponding portions of the embodiment of FIG. 4. Accordingly, corresponding portions of the embodiments of FIGS. 4 and 6 are given the same reference numeral except that those of FIG. 6 are distinguished by means of a prime (').

In particular, the body 90' has a first chamber 160 formed therein and below each of the orifices 78' and 79'. A second chamber 164 is formed in the opposite side of orifice 78' and a third chamber 166 is formed in the opposite side of orifice 79'. The spool bore 119' extends between the chambers 164 and 166 and contains the spool 100' therein. An inlet opening 162 connects the chamber 160 to the pressure source and ports 168 and 169 connect the opposite ends of the downstream orifices 106' and 107', respectively, to the tank.

A pair of springs 171 and 172 bear on the opposite sides of the spool 100' for maintaining the same in a central position within the spool bore 119' when the pressure in chambers 164 and 166 are equal. Null adjusting screws 174 and 175 are threaded into the housing 90' in a coaxial relation relative to the spool bore 119 to permit a null adjustment of the spool 100'. A first passage 122' extends from chamber 160 to the spool bore 119' and passages 120' and 121' extend between the tank outlets 169 and 168 respectively. Finally, passages 123' and 124' are formed in body 90' and intersect the spool bore 119' intermediate the passages 120' and 121'.

When the solenoids 74' and 75' are de-energized, their respective plungers 76' and 77' will be in their positions shown in FIG. 6. As a result, the pressure drops across the orifices 78' and 79' will be equal so that the same pressure will exist in the chambers 164 and 166. The spool 100 will therefore remain in a central position whereby the lands 132' and 134' will isolate passages 123' and 124' from the chamber 160 and from the tank passages 120' and 121'.

If it is desired to provide modulated pressure to the passage 123' for example, solenoid 74' will be energized by a pulse train so that its plunger 76' will be displaced from orifice 78' for preselected portion of each cycle. This will reduce the pressure drop across orifice 78' so that the pressure in chamber 164 will increase while the pressure in chamber 166 will remain the same. As a result, the spool 100 will move toward the right as viewed in FIG. 6 until land 132' moves sufficiently to connect passage 123' to chamber 160 and passage 124' to tank passage 121'. In a similar manner, energization of the solenoid 75' will result in movement of the spool 100' to the left.

Figure 7:
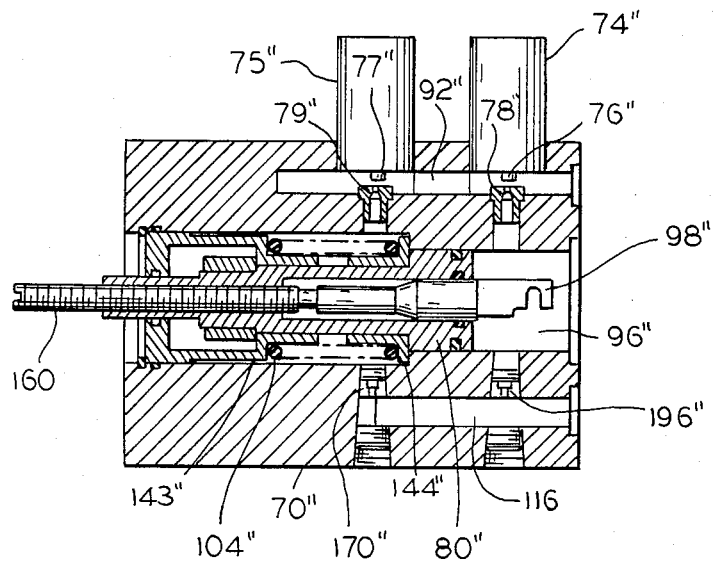

FIG. 7 shows another modified form of the regulator of FIG. 4 with corresponding parts identified by the same reference numeral but distinguished by a double prime ("). Correspondingly numbered parts function in the same manner as that discussed with respect to FIG. 2 and accordingly this description will not be repeated. It is sufficient to understand the operation of the device shown in FIG. 7 to state that one end of the piston rod 98" is connected to the spool valve and its other end is threaded at 160 to adjust the compression of return spring 97 to provide a null adjustment of the piston 80".

Figure 8:
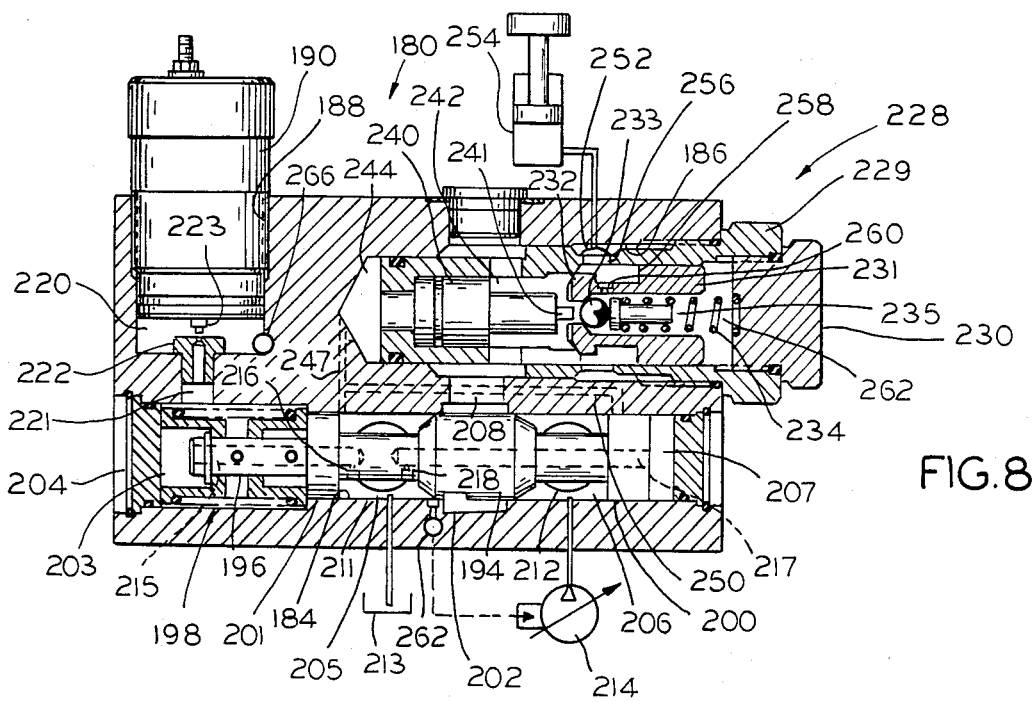
Figure 9:
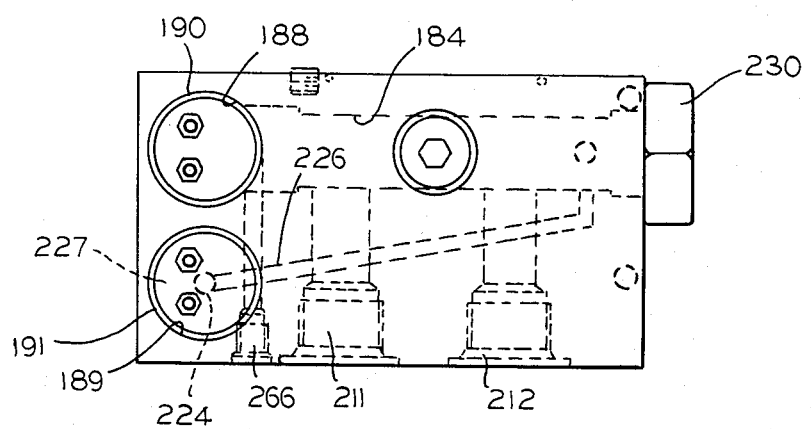

FIGS. 8 and 9 show a modified form of the regulator 180 in accordance with a further alternate embodiment of the invention. The regulator 180 includes a body 182 having a first bore 184 which extends horizontally through its lower end and along one side. A second bore 186 is formed partially through body 182 in parallelism with and disposed above the bore 184. In addition, a pair of bores 188 and 189 extend downwardly through body 182 and adjacent one side for receiving first and second solenoids 190 and 191, respectively.

Disposed within the bore 184 is a spool member 194 which is coupled by a stem 196 to a centering spring assembly 198. The spool 194 includes first and second sealing lands 200 and 201 at its opposite ends and a third larger land 202 at substantially its midpoint. The bore 184 is thus divided into a first space 203 between the land 200 and a first plug 204 in the end of bore 184, a second space 205 between the lands 201 and 202, third space 206 between the lands 202 and 200, and a fourth space 207 between the land 200 and a second plug 209 which closes the opposite end of bore 184. A first port 211 is formed in body 184 and opens into bore 184 at space 205 and a second port 212 is formed in body 182 and opens into bore 184 at space 206. The port 211 is shown in FIG. 7 to be connected to the tank 213 and port 212 is connected to a variable pressure source 214.

A first passage 215 is formed axially through the stem 196 and the land 201 and extends from the space 203 to an orifice 216 which connects the passage 215 to the space 205. In addition, a second passage 217 is formed axially in spool member 194 and extends from space 207 through the lands 200 and 202 and terminates in a second orifice 218 which connects passage 217 to the space 205.

As seen in FIG. 7, the solenoid 190 only partially fills the bore 188 to provide a space 220 therebelow. A passage 221 extends between the space 220 and the space 203. In addition, an orifice member 222 is disposed in passage 221 and in an opposed relation to the plunger 223 of solenoid 190. A similar orifice 224 is disposed below the plunger of solenoid 192 and in a passage 226 which extends from a space 227 below solenoid 192 to space 207.

A check valve assembly 228 is disposed within bore 186 and includes an adaptor 229 threadably received in the open end of the bore. The adaptor 229 is generally hollow with its outer end closed by a plug 230. A valve member 231 is disposed intermediate the ends of adaptor 229 and has a valve seat 232 provided at one end. A ball valve 233 is disposed within the valve member 231 and is urged into engagement with the valve seat 233 by means of a spring 234 which engages the plug 230 at one end and a guide member 235 which bears against the ball 233. Also disposed in adaptor 229 is a piston member 240 which has a finger 241 extending from one end for engagement with the ball 233. This provides a first space 242 between the piston 240 and the check valve assembly 228 and a second space 244 between the opposite ends of piston 240 and the end of bore 186. A first passage 247 extends between space 244 and bore 184 adjacent the land 201 and a second passage 250 extends from passage 247 to bore 184 adjacent land 200. There is in addition an outlet port 252 which intersects bore 186 and is connected to the cylinder 254 or other device being controlled. An opening 256 is formed in adaptor 229 and communicates with a port 252 and an annular recess 258 is formed in valve member 231. An orifice 260 connects the recess 258 with the space 262 defined by valve member 231, adaptor 229 and plug 230. There is also an additional port 266 which connects a pilot pressure source to the spaces 220 and 227.

When the solenoids 188 and 192 are de-energized, the pressure in passages in 221 and 226, and hence on the opposite sides of the spool valve member 200, will be equal. Accordingly, the spool will be centered by the center spring assembly 215 and will be in position shown in FIG. 7. Assume, however, that solenoid 189 is energized by a sequence of pulses such as that shown in FIG. 2. Plunger 223 will be moved from a first position adjacent the orifice 222 to a more remote position during each such pulse. This will increase the pressure in space 203 thereby moving the spool member 194 toward the right until the space 205 is connected to the space 242 through passages 267 and 268. Additionally, land 200 will uncover passage 248 thereby connecting the space 244 to the space 206. As a result, pump pressure will be applied to piston 240 moving the same to the right to uncover the ball 233 thereby connecting the cylinder 254 to the sump through the path defined by port 252, orifice 264, space 242, passages 267 and 268 and space 205. The width of the pulses applied to solenoid 189 will determine the magnitude that the spool member 194 will move to the right so that the overlap between land 200 and passage 248 will act as a throttle to control the pressure within space 244.

Should the solenoid 191 be energized, pressure within space 207 will increase thereby moving the spool member 194 to the left to connect the space 244 to tank 213 through passage 147, space 205 and port 211. Space 242 will, on the other hand, be connected to the pressure source through passages 267, 208 and space 206. This increase in pressure in space 242 will move the ball 233 from its seat thereby connecting space 242 to port 252 and hence the cylinder 254.

While only a few embodiments of the invention have been illustrated and described, the invention is not intended to be limited thereby but only by the scope of the appended claims. For example, while solenoids are depicted for varying the size of the orifices in relation to a train of pulse signals, other electro-responsive devices capable of displacing a member in response to such pulse signals may also be employed. Further, while the pulse signals are shown to have a square wave configuration, timed pulses having other shapes may also be employed, it being understood that any wave shape having sufficient amplitude to actuate the solenoids and of sufficient time duration to retain the same in an actuated condition for the requisite time period may be used. Additionally, while the upstream orifice is shown to be variable in each of the embodiments while the downstream orifice is fixed, the variable orifice may also be used downstream in which case, actuation of the solenoid would be operative to move its plunger toward the orifice rather than away from it as in the embodiments described above.

I claim:

1. A hydraulic pressure regulating device including means defining a chamber having an inlet and an outlet, an orifice disposed in said inlet and having a predetermined cross-sectional area for metering the flow of pressurized fluid relative to said chamber,
   a source of hydraulic pressure coupled to said inlet,
   electroresponsive regulating means having a plunger means oriented in an opposed relation relative to said orifice and adjacent thereto, operable to move said plunger
   said regulating means being operable to move said plunger in a timed relation in response to each of a series of electrical pulse signals for movement from a first position relative to said orifice to a second position and for returning said plunger means to its first position upon cessation of each pulse signal for changing the effective flow area of said orifice whereby the pressure in said chamber varies with the integral of said signals, and
   pressure responsive means communicating with said chamber and movable from a null position in response to changes in pressure within said chamber.

2. The pressure regulating device set forth in claim 1 wherein said plunger means is displaced first and second predetermined finite distances from said orifice when it is in each of its first and second positions respectively.

3. The pressure regulator set forth in claim 2 and including means for modifying the width of said pulse signals for changing the pressure within said chamber.

4. The pressure regulator set forth in claim 3 wherein said pressure responsive means include piston means, biasing means for biasing said piston means into said null position, said piston means being movable out of its null position in response to pressure changes within said chamber.

5. The pressure regulator set forth in claim 4 and including means defining a passage for coupling a hydraulic device to a source of hydraulic pressure, said pressure responsive means being disposed in said passage means and being operative for changing the flow rate of fluid between said source and said hydraulic device upon movement into and out of its null position.

6. The pressure regulator set forth in claim 2 wherein a second orifice is disposed in said outlet.

7. The pressure regulator set forth in claim 6 wherein said pressure responsive means include piston means, biasing means for biasing said piston means into said null position, said piston means being movable out of its null position in response to pressure changes within said chamber.

8. The pressure regulator set forth in claim 7 and including means defining a passage for coupling a hydraulic device to a source of hydraulic pressure, said pressure responsive means being disposed in said passage means and being operative for changing the flow rate of fluid between said source and said hydraulic device on movement into and out of its null position.

9. The pressure regulator set forth in claim 1 and including means defining first and second chambers, first and second orifices for metering the flow of pressurized fluid relative to first and second chambers respectively, first and second regulating means each having plunger means associated with one of said orifices respectively, means for selectively energizing one of said first and second regulating means with a series of pulse signals whereby the plunger associated with the energized regulating means is moved relative to its associated orifice to vary the pressure within one of said cylinders.

10. The pressure regulator set forth in claim 9 wherein each of said first and second said orifices has a pre-determined cross-sectional area, said regulating means including first and second electroresponsive means each having a plunger means oriented in an opposed relation respectively relative to said first and second orifices, each said electroresponsive means being operative in response to an electrical pulse signal for movement from a first position relative to the one of said orifices to a second position and for returning said plunger means to its first position upon the cessation of each pulse signal.

11. The pressure regulator set forth in claim 10 and including pressure responsive means communicating with said chambers and movable from a null position in a first direction in response to a change in pressure within said first chamber and in a second direction in response to a change in pressure within said second chamber.

12. The pressure regulator set forth in claim 11 and including means for modifying the width of said pulse signals for changing pressure within said chamber and for selectively applying said pulse signals to said first or second electroresponsive means.

13. The pressure regulator set forth in claim 12 wherein said pressure responsive means includes piston means, biasing means for biasing said piston means into said null position, said piston means being movable out of its null position in response to pressure changes within said first or second chambers.

14. The pressure regulator set forth in claim 13 and including means defining a passage for coupling a hydraulic device to a source of hydraulic pressure, said pressure responsive means being disposed in said passage means and being operative for changing the direction and flow rate of fluid between said source and said hydraulic device upon movement into and out of its null position.

15. The pressure regulator set forth in claim 14 wherein each said chamber has an inlet and an outlet, said first and second orifices being disposed respectively in said inlets, the first position of said plungers, being adjacent said orifice, whereby the pressure in said chambers is related to the integral of said pulse signals.

16. The pressure regulator set forth in claim 15 wherein third and fourth orifices are disposed in the outlets of said first and second chambers respectively.

17. The pressure regulating device set forth in claim 2 wherein the electroresponsive regulating means comprises a solenoid having a response time shorter than the duration of said pulse signals or the interval therebetween whereby said plunger will move to its second position upon the initiation of each signal and return to its first position upon the cessation thereof.

18. A method of regulating hydraulic pressure within a chamber having an inlet opening connected to a source of hydraulic pressure and an outlet opening and an orifice disposed between said inlet opening and said chamber, the steps of: disposing a plunger means in an opposed relation to said orifice whereby the distance between said plunger means and said orifice will control the pressure drop across said orifice, generating a series of discrete electrical pulse signals, moving said plunger means into a first position which is a first finite distance from said orifice in response to the initiation of each pulse signal and into a second position which is a second finite distance from said orifice in response to the cessation of each pulse signal, and controlling the duration of said pulse signals whereby the pressure within said chamber is controlled in relation to the integral of said pulse signals.

19. The method set forth in claim 18 and including the steps of progressively increasing the width of said pulse signals during a first time period and progressively decreasing the width of said pulse signals during a second time period whereby the pressure within said chamber will increase during said first period and decrease during said second period.

20. The method set forth in claims 18 or 19 wherein there are first and second chambers each having an inlet connected to said source and an outlet and first and second orifices respectively disposed between said inlets and said first and second chambers and first and second plunger means respectively disposed adjacent said first and second orifices and first and second electroresponsive means for respectively moving said first and second plungers relative to said orifices upon the receipt of said signals, and including the step of selectively providing said pulse signals to one of said electroresponsive means to increase the pressure in a selected one of said chambers.

21. The method set forth in claim 18 and including the step of progressively modifying the width of said pulse signals from a first width to a second width over a predetermined time period to modify the pressure within said chamber from a first preselected value to a second preselected value.

22. The method set forth in claim 18 wherein said pulse signals have a predetermined frequency and increasing the integral of said signals from a first value to a second value at a controlled rate so that the pressure within the chamber increases from a first value to a second value at a predetermined controlled rate.

23. A method of controlling the hydraulic pressure in a chamber having an inlet opening and an outlet opening, providing hydraulic fluid under pressure to said inlet opening and withdrawing hydraulic fluid from said outlet opening, positioning a plunger a first predetermined distance from said inlet opening to provide a first predetermined pressure drop across said inlet opening during each of a first series of discrete repetitive time intervals which are separated by intermediate time intervals, positioning the plunger a second predetermined distance from the inlet opening to provide a second predetermined pressure drop across said orifice during each intermediate time interval to provide a predetermined pressure within said chamber, and gradually modifying the length of the first time intervals relative to the intermediate time intervals so that the pressure within said chamber will change from a first predetermined value to a second predetermined value at a rate which is functionally related to the rate at which the relative lengths of said intervals are modified.

24. A hydraulic pressure regulating device including means defining a hydraulic chamber having first and second openings, an orifice disposed in one of said openings, a source of hydraulic pressure coupled to one of said openings, pulse generating means for generating a series of discrete electrical pulse signals each having a time duration and a time interval between pulses, electroresponsive regulating means including a plunger disposed in an oppposed relation relative to said orifice, said regulating means being coupled to said pulse generating means and operable to move said plunger from a first poistion displaced a first predetermined distance from the orifice upon the initiation of each pulse signal to a second position displaced a second predetermined distance from said orifice and for returning the plunger to its first position upon the termination of a pulse signal so that the effective flow area of the orifice is a function of the time integral of the pulse signals, and means for modifying the integral of said pulse signal so that the pressure within said chamber can be modified at a controlled rate.

* * * * *